United States Patent
Thambundit

(10) Patent No.: US 11,349,671 B2
(45) Date of Patent: May 31, 2022

(54) AUTHENTICATING COMMUNICATION

(71) Applicant: salesforce.com, inc., San Francisco, CA (US)

(72) Inventor: Koson Thambundit, San Ramon, CA (US)

(73) Assignee: salesforce.com, inc., San Francisco, CA (US)

( * ) Notice: Subject to any disclaimer, the term of this patent is extended or adjusted under 35 U.S.C. 154(b) by 287 days.

(21) Appl. No.: 16/257,064

(22) Filed: Jan. 24, 2019

(65) Prior Publication Data
US 2020/0244467 A1 Jul. 30, 2020

(51) Int. Cl.
*H04L 29/06* (2006.01)
*H04L 9/32* (2006.01)
*H04L 9/14* (2006.01)
*H04L 9/08* (2006.01)

(52) U.S. Cl.
CPC .......... *H04L 9/3263* (2013.01); *H04L 9/0861* (2013.01); *H04L 9/14* (2013.01)

(58) Field of Classification Search
CPC combination set(s) only.
See application file for complete search history.

(56) References Cited

U.S. PATENT DOCUMENTS

| | | |
|---|---|---|
| 5,201,000 A | 4/1993 | Matyas et al. |
| 6,317,829 B1 | 11/2001 | Van Oorschot |
| 2003/0037237 A1* | 2/2003 | Abgrall ................ H04L 63/123 713/166 |
| 2017/0250978 A1* | 8/2017 | Wang .................. H04L 63/0823 |

OTHER PUBLICATIONS

Dan Boneh and Matthew Franklin, Identity-Based Encryption From the Weil Pairing, Part of the Lecture Notes in Computer Science (LNCS, vol. 2139), 2001, 31 pages.

* cited by examiner

*Primary Examiner* — Baotran N To
*Assistant Examiner* — Leynna Truvan
(74) *Attorney, Agent, or Firm* — Kowert, Hood, Munyon, Rankin & Goetzel, P.C.

(57) ABSTRACT

Techniques are disclosed relating to authenticating communications. A computer system may generate a master private key usable to derive user-specific private keys for a plurality of users hosted by a particular application. The computer system may generate master public configuration information usable to derive user-specific public keys for the plurality of users. The computer system may send that configuration information to a directory service accessible to applications that communicate with the particular application. The computer system may receive, from the particular application, a request for a user-specific private key for one of the plurality of users. The request may include an identifier of the user. The computer system may perform a key derivation function to generate a particular user-specific private key based on the master private key and the identifier of the user. The computer system may send the particular user-specific private key to the particular application.

20 Claims, 8 Drawing Sheets

AUTHENTICATING COMMUNICATION

BACKGROUND

Technical Field

This disclosure relates generally to authenticating communications.

Description of the Related Art

Generally speaking, applications communicate with one another to access information or functionality provided by the other application. In some cases, these applications are a part of the same ecosystem, yet in other cases, they are unrelated to each other. In either case, these applications often authenticate requests received from other applications in order to ensure that those applications are who they claim to be—i.e., to ensure that a malicious actor is not posing as a known, legitimate application. For example, when sending a request, an application may use a private key to sign the request and then the receiving application may use a public key to verify the signature for that request.

Figure 1:
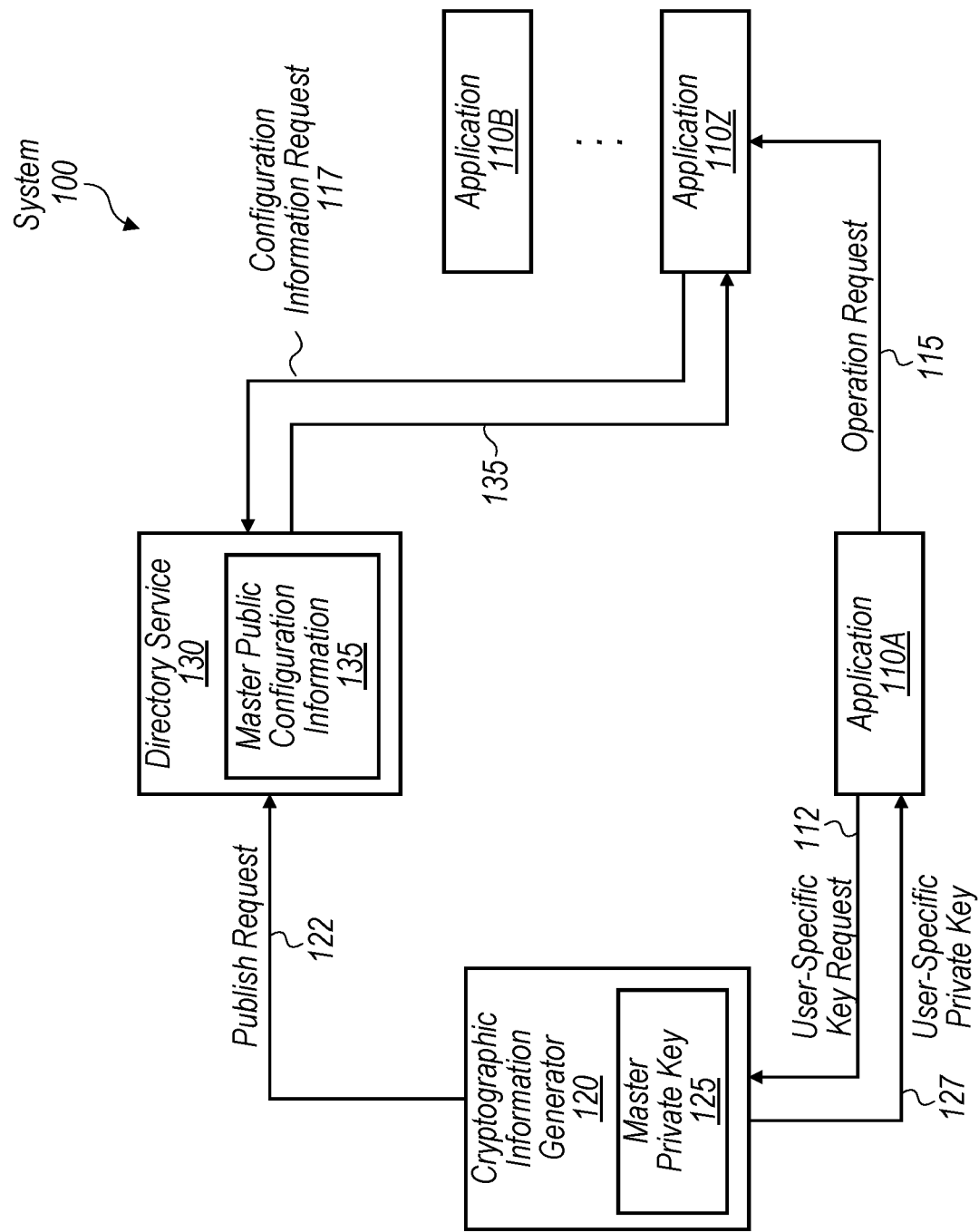
FIG. 1 is a block diagram illustrating example elements of a system for authenticating communications between applications, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, for an application coalition that has multiple applications, the terms "first" application and "second" application can be used to refer to any application of the application coalition. In other words, the first and second applications are not limited to the initial two applications of an application coalition.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

Certain computer applications may provide functionality for multiple users of those applications. As an example, a customer relationship management (CRM) platform may host thousands of users who store data at the platform and use functionality supported by the platform. In many instances, multi-user applications communicate requests between one another on behalf of their users—for example, a request from user A of multi-user application 1 may be communicated to user B of multi-user application 2. A request may be signed, for example, using a private key of the user on whose behalf the request is sent and verified using a corresponding public key for that user. Private keys are typically stored in a secure location while public keys are made available to the applications that use them. Multi-user applications, however, may host thousands of users and thus have to maintain thousands of keys in order to be able to send and receive requests on behalf of their users. But maintaining thousands of keys goes beyond what current public key infrastructure supports.

The present disclosure describes various techniques that enable multi-user applications to have access to cryptographic information usable for authenticating communications in a way that overcomes some or all of the downsides of prior approaches. In various embodiments that are described below, a system implements: an identity-based cryptographic scheme that makes use of identifiers associated with users to derive cryptographic keys that are user-specific; and a directory service that maintains configuration information that is accessible to applications for deriving public keys that are user-specific. In one example implementation, a computer system generates a master private key that it maintains locally and master public configuration information that it sends to the directory service. After receiving a request from an application for a user-specific private key, in the example implementation, the computer system derives a user-specific private key based on the master private key and an identifier of the user specified by that request. The user-specific private key may be returned to the application, which may use that key to sign requests to other applications on behalf of the user that corresponds to the identifier. In various embodiments, an application that receives a signed request to perform an operation uses a reference that is specified by the signed request to access the master public configuration information from the directory service. Using that information, the application may derive a user-specific public key for the user based on the identifier of the user. As such, the receiving application may authenticate the request by verifying the signature on that signed request using the user-specific public key.

These techniques may be advantageous over prior approaches as these techniques allow for applications to authenticate communications without having to maintain thousands of keys for all the users hosted by an application. Thus, system resources that were previously allocated for storing thousands of keys may be freed up for use in other ventures. Additionally, in various cases, keys are periodically refreshed (e.g., every 30 days). In prior approaches, thousands of keys had to be refreshed, but these techniques may involve refreshing only a small set of keys, saving computing resources. Moreover, the directory service may serve as a central, trusted source that enables multiple applications to have access to cryptographic information. By using a directory service as a trusted source, it may be easier to detect malicious applications that are attempting to impersonate legitimate applications. An example system for implementing these techniques will now be discussed below, starting with FIG. 1.

Turning now to FIG. 1, a block diagram of a system 100 is shown. System 100 is a set of components that are implemented via hardware or a combination of hardware and software routines. In the illustrated embodiment, system 100 includes applications 110, a cryptographic information generator 120, and a directory service 130. Also as shown, generator 120 includes a master private key 125, and service 130 includes master public configuration information 135. Some or all of the components of system 100 may be operated under the same entity. For example, application 110A and generator 120 may be executed by a set of computer systems associated with a particular entity. System 100, in some embodiments, may be implemented differently than shown. For example, system 100 may include multiple generators 120.

Applications 110, in various embodiments, are software routines that are executable to perform various functions and tasks. Examples of applications 110 include, but are not limited to, a customer relationship management service, a content streaming service, an email service, and a database management system. In some embodiments, applications 110 provide services to multiple users (which may include tenants such as a single individual, a company, a coalition of companies, a governmental entity, etc.). Applications 110 may be accessible to those users over a wide-area network such as the Internet and thus applications 110 may be hosted on or a part of a cloud service.

In various embodiments, applications 110 are operable to communicate with each other via, e.g., operation requests 115. Operation requests 115 may specify a set of operations (e.g., access certain records, manipulate certain records, transmit notifications, etc.) to be carried out by the receiving application 110. Consider an example in which application 110A implements a service that advertises to individuals on behalf of multiple companies, and application 110Z implements a service that stores records about the individuals related to each of the respective companies. In that example, application 110A may send an operation request 115 to application 110Z to retrieve, on behalf of a particular company using application 110A, records for certain individuals related to that company. It is noted that, in various cases, applications 110 that are communicating with each other may host at least some of the same users. Accordingly, in some cases, two applications 110 that are in communication may be operated by the same entity. For example, application 110A and application 110B may be two different services offered by the same company, although those services may be part of different domains or even sub-domains of the same domain. As such, two or more applications 110 may be a part of the same multi-user system that hosts some set of users, where each application implements a service for those users.

When applications 110 communicate with each other, the sending application 110 may sign an operation request 115 with a user-specific private key 127 and the receiving application 110 may authenticate that signature using a user-specific public key. Returning to the previous example, application 110Z may authenticate the operation request 115 from application 110A using a public key specific to the particular company on whose behalf that request was sent. In various embodiments, the sending application 110 obtains a user-specific private key 127 from generator 120 while the receiving application 110 may derive a user-specific public key based on master public configuration information 135, which may be obtained from directory service 130. While the present disclosure discusses signing requests, the techniques that are discussed herein may be applied more broadly such as being used for encrypting communications among computer systems. Examples of applications 110 are discussed in greater detail with respect to FIGS. 4A and 4B.

Cryptographic information generator 120, in various embodiments, facilitates the generation of cryptographic information, which may be used to authenticate communications (e.g., operation requests 115) between applications 110. Such cryptographic information may include master private key 125, user-specific private keys 127, and master public configuration information 135. In various embodiments, cryptographic information is generated on behalf of a particular application 110 and thus the cryptographic information may be used to authenticate communications between the particular application 110 and other applications 110. Generator 120 may thus be assigned to an application 110 to generate the cryptographic information for that application 110. For example, generator 120 might generate cryptographic information for application 110A, where such information is usable to authenticate communication between application 110A and one or more of applications 110B-Z. In some instances, applications 110 may each be assigned a respective generator 120; in yet some cases, a given generator 120 may be assigned to multiple applications 110. In various cases, the cryptographic information may be smaller in memory size than alternatively maintaining public and private keys for each user of an application 110. Thus, a system that maintains the cryptographic information in place of keys for each user may have more available resources—resources that were previously used to store the keys for each user—that can be allocated to other tasks.

After generating master private key 125 and master public configuration information 135 for an application 110, in various embodiments, generator 120 maintains master private key 125 locally, but sends (via a publish request 122) master public configuration information 135 to directory service 130. As discussed in more detail below, directory service 130 may be accessible to applications 110 and thus, when attempting to verify the signature of an operation request 115, an application 110 may access, from directory service 130, the appropriate master public configuration information 135. That application 110 may then derive a user-specific public key based on that master public configuration information 135.

When an application 110 wishes to send an operation request 115 to another application 110, the sending application 110 may issue a user-specific key request 112 to generator 120 in order to obtain a user-specific private key 127 usable to sign the operation request. In various embodiments, a given user-specific key request 112 specifies an identifier associated with the user on whose behalf the corresponding operation request 115 is being sent. Accordingly, in some embodiments, generator 120 generates a particular user-specific private key 127 based on master private key 125 and the identifier indicated by a key request 112. Generator 120 may then return the particular user-specific private key 127 to the appropriate application 110 for signing an operation request 115. An example generator 120 is discussed in greater detail with respect to FIG. 2.

Directory service 130, in various embodiments, implements a data store accessible to applications 110 for accessing master public configuration information 135 stored at the data store. As mentioned earlier, system 100 may include multiple generators 120 that may generate cryptographic information for their associated applications 110. Accordingly, in various cases, directory service 130 may maintain multiple, different instances of master public configuration information 135, each of which may be received from a respective generator 120. In order to ensure that a given generator 120 (or some other entity) does not attempt to store configuration information 135 for applications 110 that are not associated with that given generator, directory service 130 may authenticate a generator 120 when it attempts to store information at directory service 130—example authentication methods are discussed in greater detail with respect to FIG. 3.

When an application 110 wishes to authenticate an operation request 115 received from another application 110, the receiving application 110 may issue a configuration information request 117 to directory service 130 for accessing the appropriate master public configuration information 135. In various embodiments, a given configuration information request 117 may include a reference to the appropriate configuration information 135. Accordingly, directory service 130 may use the reference included in a request 117 to locate configuration information 135, which may be sent to the appropriate application 110 for deriving a user-specific public key for authenticating a signed operation request 115.

Figure 2:
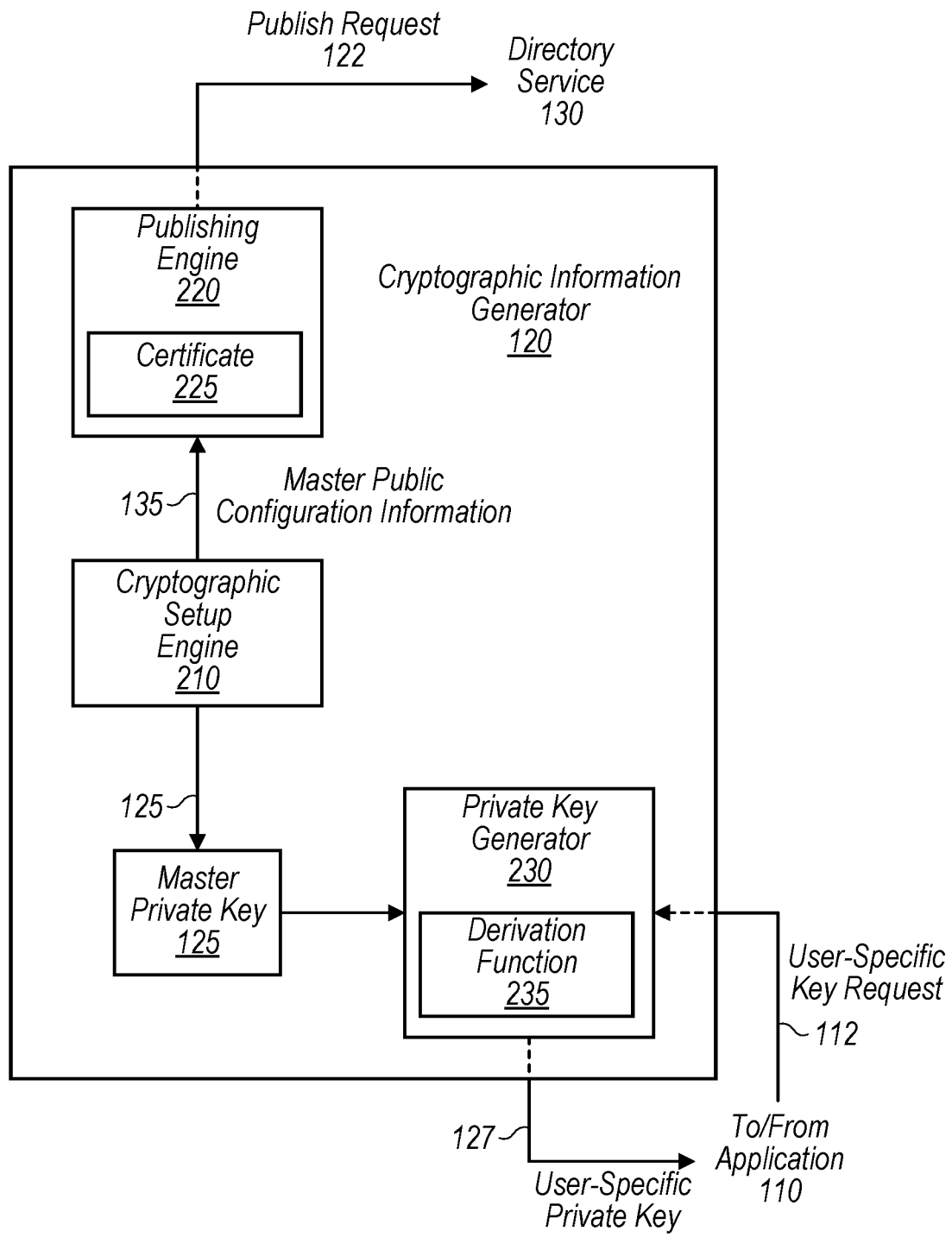
FIG. 2 is a block diagram illustrating example elements of a cryptographic information generator capable of generating cryptographic information, according to some embodiments.

Turning now to FIG. 2, a block diagram of an example cryptographic information generator 120 is shown. In the illustrated embodiment, generator 120 includes a cryptographic setup engine 210, a publishing engine 220, and a private key generator 230. As further shown, generator 120 includes master private key 125, publishing engine 220 includes a certificate 225, and private key generator 230 includes a derivation function 235. Generator 120, in some embodiments, may be implemented differently than shown. As an example, publishing engine 220 may not include certificate 225.

As explained earlier, generator 120 may generate cryptographic information usable for authenticating communications (e.g., operation requests 115) between applications 110. Such cryptographic information may include master private key 125, user-specific private keys 127, and master public configuration information 135. In the illustrated embodiment, master private key 125 is stored locally and is not sent outside of generator 120. User-specific private keys 127 and master public configuration information 135, however, may be sent outside of generator 120.

Cryptographic setup engine 210, in various embodiments, facilitates the authenticated communication between applications 110 by setting up initial cryptographic information that may be used to derive user-specific keys. Such initial cryptographic information may include master private key 125 and master public configuration information 135. Engine 210, in some embodiments, generates master private key 125 by randomly selecting a value from a defined set. For example, a particular master private key 125 might be a non-negative integer value that is selected from a set that includes non-negative integers up to (but, in various cases, not including) a particular prime value. Engine 210, in some embodiments, generates master public configuration information 135 by generating one or more parameters that may be used as part of a cryptographic algorithm. Such parameters may include, for example, one or more cryptographic hash functions, a prime value, a bilinear map, and/or a random generator. Engine 210, in various embodiments, provides configuration information 135 to publishing engine 220 for publishing to directory service 130. Engine 210 may, however, maintain master private key 125 and a copy of configuration information 135 at generator 120.

Publishing engine 220, in various embodiments, publishes (or uploads) master public configuration information 135 received from setup engine 210 to directory service 130 (so that information 135 may be available to applications 110). As mentioned earlier, before accepting and storing configuration information 135, directory service 130 may verify that the corresponding generator 120 has the authority to publish that configuration information 135 for the associated application 110. Generator 120 may provide such proof via a certificate 225. Certificate 225, in various embodiments, includes information relating to generator 120 such as what applications 110 are associated with generator 120. For example, certificate 225 may specify a domain name that is usable for accessing a marketing cloud service. Generator 120 may operate under that domain name and generate cryptographic information on behalf of that service—thus, generator 120 may be associated with that service.

While not shown, in various embodiments, generator 120 is associated with a certificate agent that maintains certificate 225. The certificate agent may periodically refresh certificate 225 by obtaining a new certificate 225 from the appropriate certificate authority. Accordingly, the certificate agent may store that certificate 225 in a storage medium accessible to publishing engine 220. In some embodiments, when certificate 225 is refreshed, generator 120 refreshes master private key 125 and master public configuration information 135 by generating a new version of that cryptographic information. Accordingly, publishing engine 220 may publish that master public configuration information 135 whenever that information is refreshed. The certificate agent may also store a private cryptographic key that can be used to sign a publish request 122.

In various embodiments, when publishing master public configuration information 135 to directory service 130, publishing engine 220 may issue a publish request 122 that includes that information and certificate 225. Publishing engine 220 may sign that publish request 122 with a private cryptographic key. The corresponding public cryptographic key may be included in certificate 225. Accordingly, directory service 130 may contact the appropriate certificate authority to validate certificate 225. Once certificate 225 has been validated, directory service 130 may store master public configuration information 135 and register that information under generator 120 and the appropriate applications 110.

Private key generator 230, in various embodiments, generates private keys 127 that are specific to respective users of an associated application 110. Private key generator 230 may generate a user-specific private key 127 based on master private key 125 and an identifier of the user for which that key is being generated. Such an identifier, in various embodiments, may comprise various portions. For example, an identifier may include a portion that identifies the appropriate application 110, a portion that identifies the server farm where that application 110 is running, a portion that identifiers the user, and/or a portion that identifies the date. In various embodiments, the identifier of the user is included in the user-specific key request 112 received by private key generator 230.

In response to receiving a user-specific key request 112, private key generator 230 may execute a derivation function 235 that takes in master private key 125 and the identifier of the user and outputs a particular user-specific private key 127. Derivation function 235 may derive a user-specific private key 127 in some embodiments by multiplying master private key 125 and a hashed version of the identifier of the user. The hashed version of the identifier may be derived by executing a hash function included in master public configuration information 135. Private key generator 230 may return the generated user-specific private key 127 to the requesting application 110.

In some cases, private key generator 230 may receive a key request 112 for a user that is not associated with generator 230 (i.e., not one of the users for which generator 230 manages keys). Accordingly, in response to receiving such a key request, generator 230 may reject the request and not return a user-specific private key 127. In various embodiments, cryptographic information generator 120 and the applications 110 associated with it are deployed on the same virtual cluster. In such embodiments, cryptographic information generator 120's interface may be exposed only to systems in the virtual cluster and thus may be accessible only to applications 110 deployed on the same virtual cluster as generator 120. In this manner, private key generator 230 may be prevented from generating keys 127 for unauthorized users as private key generator 230 may be inaccessible to unauthorized applications 110 that are outside of its virtual cluster.

Figure 3:
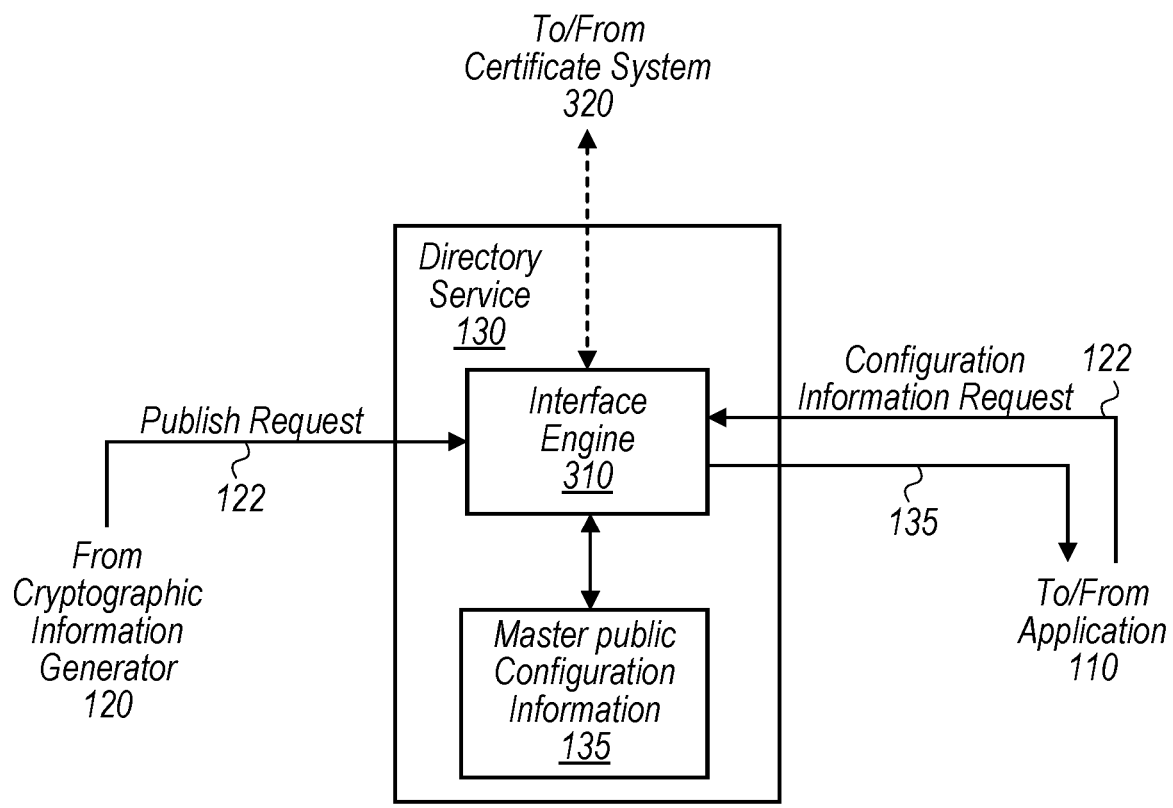
FIG. 3 is a block diagram illustrating example elements of a directory service capable of storing and providing master public configuration information to applications, according to some embodiments.

Turning now to FIG. 3, a block diagram of an example directory service 130 accessible to applications 110 is shown. In the illustrated embodiment, service 130 includes master public configuration information 135 and interface engine 310. Service 130, in some embodiments, may be implemented differently than shown. For example, service 130 may include certificate system 320.

As mentioned earlier, directory service 130 may maintain multiple, different versions of master public configuration information 135. For example, system 100 might include five applications 110, each of which may be associated with a respective generator 120. Directory service 130 may store respective master public configuration information 135 for each of those five applications 110. Directory service 130 may be accessible to those five applications 110 so that when one of those applications 110 receives an operation request 115 from another one of those application 110, it may retrieve the respective master public configuration information 135 for that other application.

Interface engine 310, in various embodiments, facilitates the storing and accessing of master public configuration information 135. Accordingly, interface engine 310 may receive a publish request 122 from generator 120 to publish configuration information 135. In response to receiving such a publish request, interface engine 310 may authenticate generator 120 and verify that it has the authority to store configuration information 135. In various embodiments, interface 310 extracts a certificate 225 from publish request 122 and then communicates with certificate system 320 to authenticate certificate 225. If certificate 225 is invalid, then interface engine 310 may reject publish request 122, otherwise interface engine 310 may extract a public cryptographic key from certificate 225 and verify a signature of publish request 122. If such a signature is invalid, then interface engine 310 may reject publish request 122, otherwise engine 310 may store master public configuration information 135 in association with an identifier that corresponds to the appropriate application 110. The identifier, for example, may indicate a domain associated with generator 120 and the corresponding application 110. In some cases, the identifier is included in certificate 225.

In various embodiments, interface engine 310 receives requests 117 for master public configuration information 135. A request 117, in various embodiments, indicates an identifier corresponding to a particular master public configuration information 135. The identifier, for example, may indicate a domain of the application 110 that sent operation request 115 or may directly indicate master public configuration information 135. As such, interface engine 310 may retrieve the appropriate master public configuration information 135 using the identifier included in a request 117. Interface engine 310 may then return configuration information 135 to the requesting application 110.

Figure 4A:
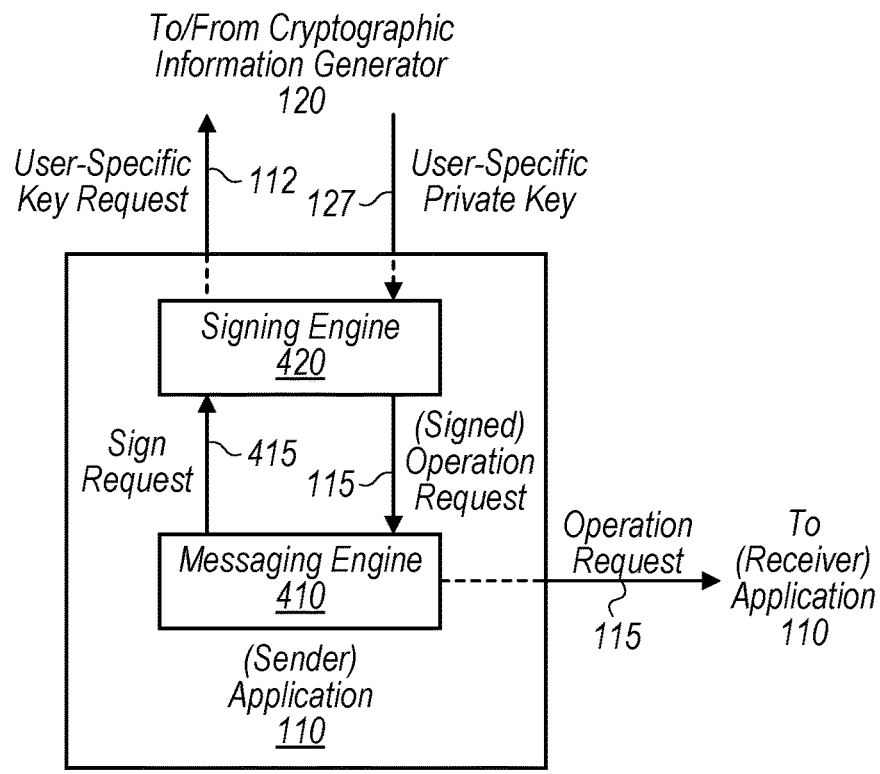
FIG. 4A is a block diagram illustrating example elements of an application capable of sending a request to another application, according to some embodiments.

Turning now to FIG. 4A, a block diagram of components of an example application 110 that facilitate the sending of an operation request 115 is shown. In the illustrated embodiment, application 110 includes a messaging engine 410 and a signing engine 420. Application 110, in some embodiments, may be implemented differently than shown. For example, application 110 may include an authentication engine for authenticating operation requests 115 received from other applications 110—an example authentication engine is discussed in more detail with respect to FIG. 4B.

Messaging engine 410, in various embodiments, sends operation requests 115 on behalf of users of application 110 to other applications 110. For example, messaging engine 410 may send an operation request 115 on behalf of a particular user to another application 110 to access privileged information. As explained earlier, the receiving application 110 may verify that the operation request 115 was sent on behalf of the particular user before performing the requested operation. To verify an operation request 115, the receiving application 110 may authenticate a signature of that operation request. Accordingly, in various embodiments, before sending an operation request 115, messaging engine 410 may issue a sign request 415 to signing engine 420 to sign that operation request.

Signing engine 420, in various embodiments, signs operation requests 115 on behalf of users of application 110. In some instances, signing engine 420 may issue a user-specific key request 112 to generator 120 for a user-specific private key 127 that is for a user identified in a sign request 415 received from messaging engine 410. Accordingly, signing engine 420 may receive a particular user-specific private key 127 from generator 120. In various embodiments, signing engine 420 signs the particular operation request 115 that messaging engine 420 wants to send to another application 110. In various cases, signing engine 420 may encrypt a portion of the particular operation request 115 using the particular user-specific private key 127 from generator 120. For example, signing engine 420 may create, using a user-specific private key 127, a digital signature from the content of a JSON web token that is included in an operation request 115 and may append the digital signature to that token. In some cases, signing engine 420 may generate a nonce that it encrypts using a user-specific private key 127. Once operation request 115 has been signed, signing engine 420 may return the signed request to messaging engine 410, which may send the request to the appropriate application 110.

Figure 4B:
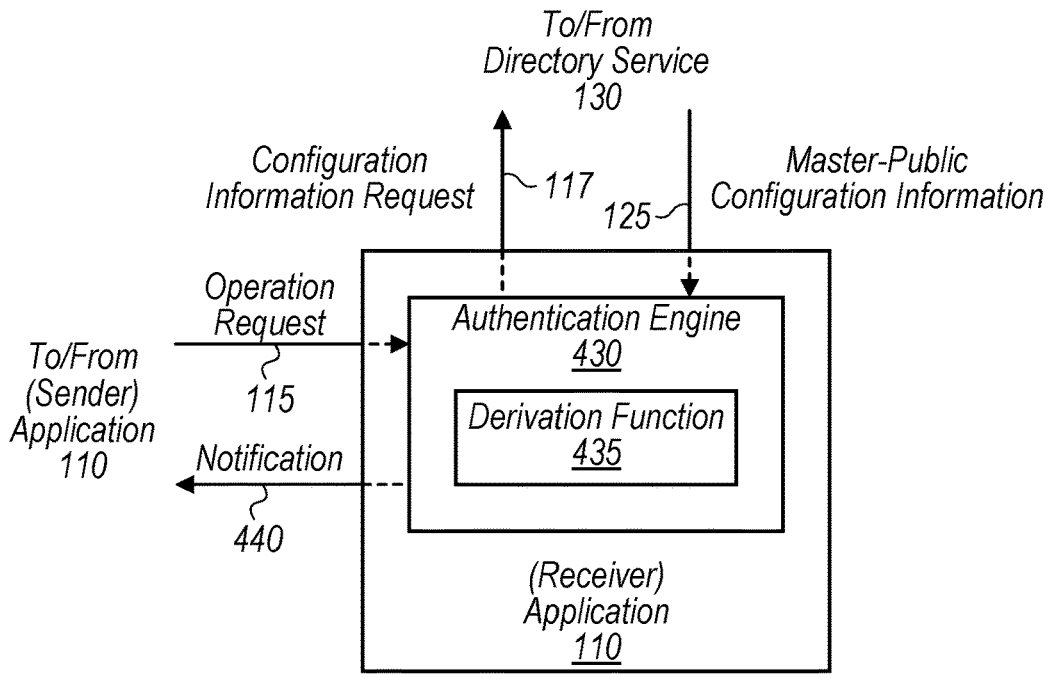
FIG. 4B is a block diagram illustrating example elements of an application capable of authenticating requests received from another application, according to some embodiments.

Turning now to FIG. 4B, a block diagram of components of an example application 110 that facilitate the authentication of a received operation request 115 is shown. In the illustrated embodiment, application 110 includes an authentication engine 430 that includes a derivation function 435. In various embodiments, application 110 may include messaging engine 410 and signing engine 420, although not shown.

Authentication engine 430, in various embodiments, authenticates operation requests 115 received from other applications 110. As explained earlier, an operation request 115 may be signed by the sending application 110 using a user-specific private key 127 and may include information that enables authentication engine 430 to retrieve, from directory service 130, the appropriate master public configuration information 135. Accordingly, in response to receiving an operation request 115, authentication engine 430 may issue a configuration request 117 to directory service 130. Configuration information request 117 may identify (e.g., via a reference value that may be included in a JSON Web Token sent in operation request 115) the appropriate master public configuration information 135, which may be received as a response from directory service.

After retrieving configuration information 135, in various embodiments, authentication engine 430 performs a derivation function 435 to derive a user-specific public key for the user identified in a received operation request 115. Derivation function 435 may involve performing a hash function included in configuration information 135 on an identifier of the user. Such an identifier may correspond to the one that was used to generate the corresponding user-specific private key 127 by generator 120. Once the user-specific public key has been generated for the user, authentication engine 430 may verify the signature of the received operation request 115, which may involve decrypting a portion of that operation request using the user-specific public key. In various embodiments, application 110 sends a notification 440 to the application 110 that send the operation request 115. Notification 440 may identify whether the operations that were requested in operation request 115 were performed or whether that request was rejected (e.g., because the signature was invalid, the user is not a part of the receiving applications 110, etc.).

Figure 5:
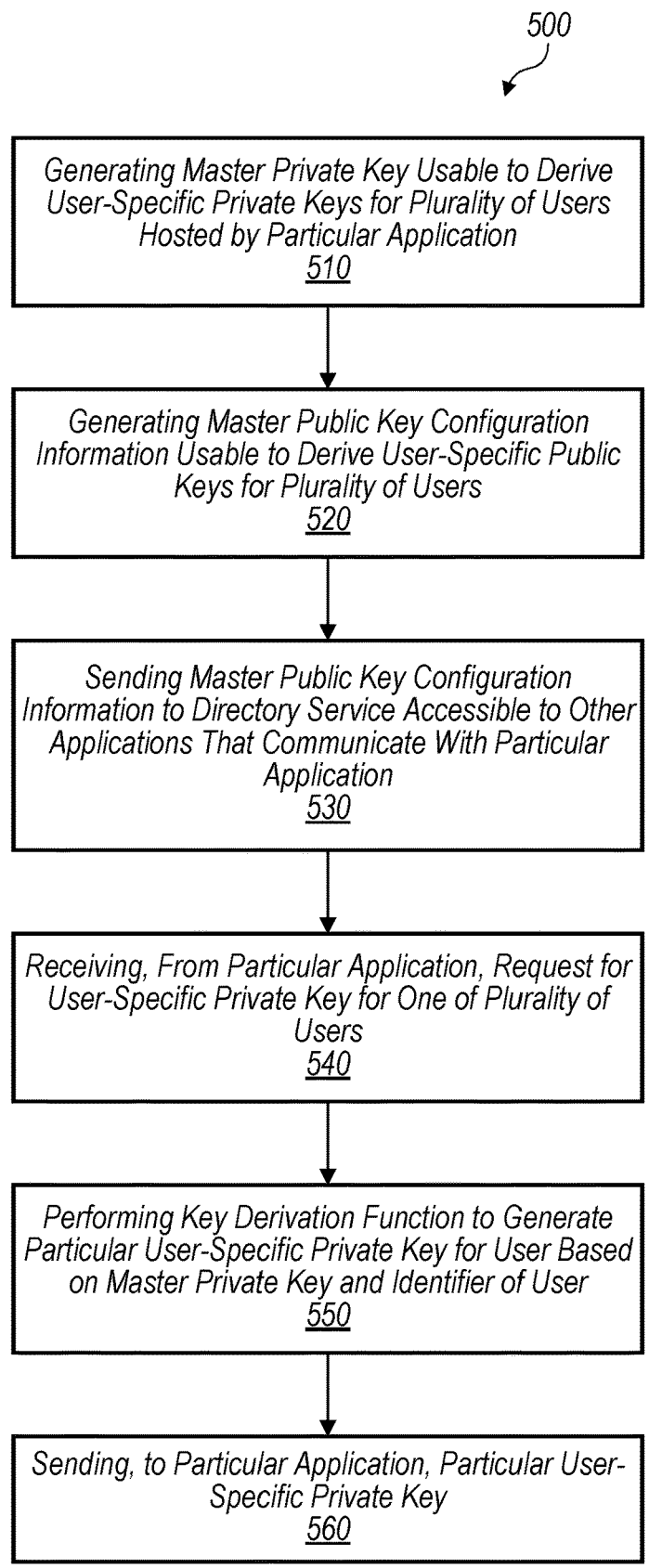
FIGS. 5-7 are flow diagrams illustrating example methods for facilitating authenticated communications between applications, according to some embodiments.

Turning now to FIG. 5, a flow diagram of a method 500 is shown. Method 500 is one embodiment of a method performed by a computer system (e.g., one that implements generator 120) to facilitate authenticated communication (e.g., by generating cryptographic information) between applications (e.g., applications 110). In some embodiments, method 500 may include additional steps. For example, the computer system may perform a refresh operation to refresh a master private key (e.g., master private key 125) and master public configuration information (e.g., information 135).

Method 500 begins in step 510 with the computer system generating a master private key that is usable to derive user-specific private keys (e.g., user-specific private keys 127) for a plurality of users hosted by a particular application. The master private key may, for example, be a non-negative integer value selected (e.g., randomly selected) from a set of non-negative integers.

In step 520, the computer system generates master public configuration information (e.g., configuration information 135) usable to derive user-specific public keys for the plurality of users.

In step 530, the computer system sends the master public configuration information to a directory service (e.g., directory service 130) that is accessible to other applications that communicate with the particular application. The master public configuration information may be usable by the other applications to derive user-specific public keys that can be used to authenticate communications (e.g., operation requests 115) from the particular application. In some embodiments, when sending the master public configuration information, the computer system accesses certificate information (e.g., certificate 225) that indicates that the computer system is authorized to generate cryptographic information for the plurality of users hosted by the particular application. As such, the computer system may send, to the directory service, the certificate information to enable registration of the master public configuration information at the directory service on behalf of the particular application.

In step 540, the computer system receives, from the particular application, a request (e.g., user-specific key request 112) for a user-specific private key (e.g., user-specific private key 127) for one of the plurality of users. The user-specific private key may be useable to sign a request (e.g., an operation request 115) from the particular application to one of the other applications on behalf of the user. The request may include an identifier of the user and the particular application may be a cloud-based service that is operable to store data for the plurality of users. The identifier of the user may identify the cloud-based service, a server farm having the computer system on which the cloud-based service is executed, and/or the user. In some cases, the computer system may receive a subsequent request for a user-specific private key for a particular user that is not indicated by the certificate information. Accordingly, the computer system may reject the subsequent request.

In step 550, the computer system performs a key derivation function (e.g., key derivation function 235) to generate a particular user-specific private key for the user based on the master private key and the identifier of the user.

In step 560, the computer system sends, to the particular application, the particular user-specific private key. The particular application may be operable to sign the request to the other application using the particular user-specific key. The request to the other application may also include information that identifies the master public configuration information stored at the directory service.

In various cases, the computer system may receive, from the particular application, a subsequent request (e.g., another user-specific key request 112) for a user-specific private key for a different one of the plurality of users. The subsequent request may include an identifier of the different user. As such, the computer system may perform the key derivation function to generate a different particular user-specific private key for the different user based on the master private key and the identifier of the different user.

Figure 6:
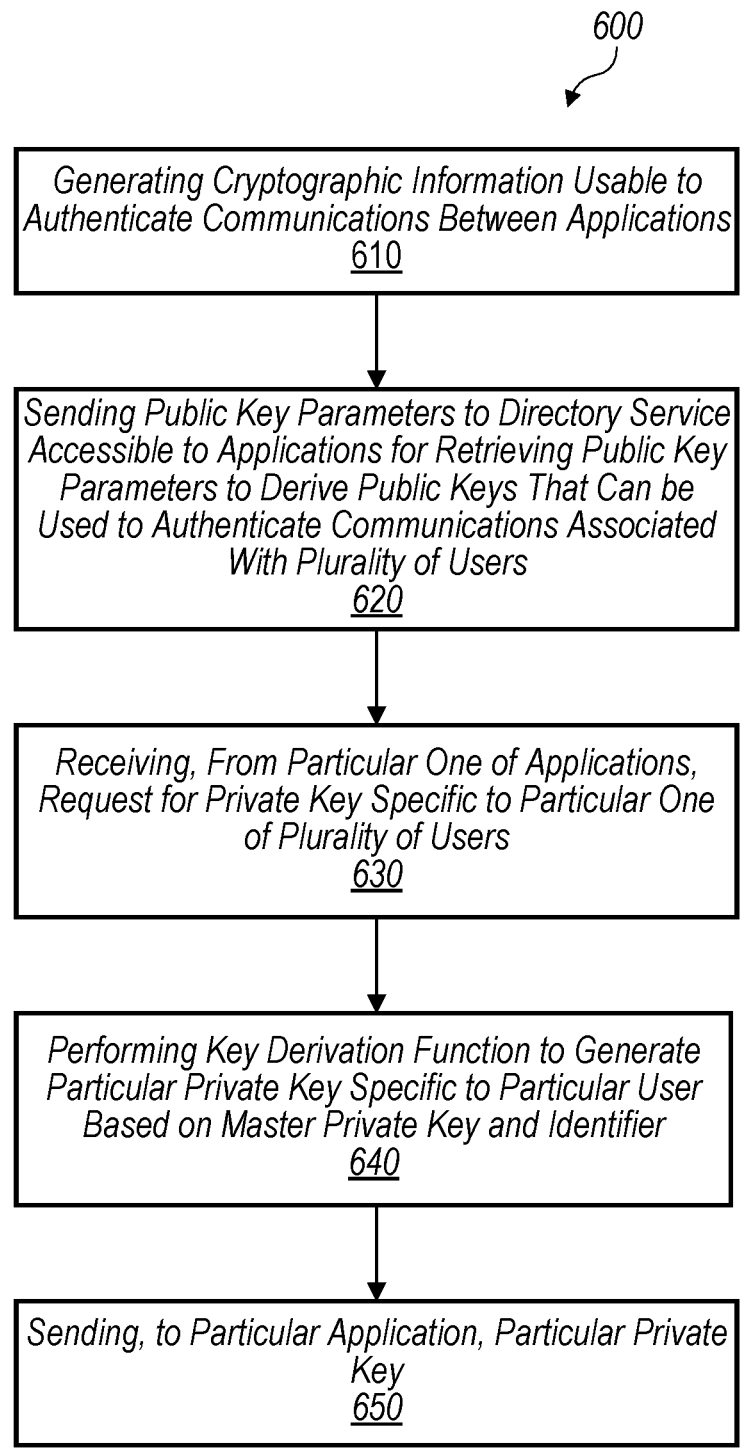

Turning now to FIG. 6, a flow diagram of a method 600 is shown. Method 600 is one embodiment of a method performed by a computer system (e.g., one that implements generator 120) to enable applications (e.g., applications 110) to authenticate communications between themselves Method 600 may be performed by executing a set of program instructions stored on a non-transitory computer-readable medium. In some embodiments, method 500 may include additional steps. For example, the computer system may perform, in response to an update to certificate information (e.g., certificate 225), a refresh operation to generate new cryptographic information.

Method 600 begins in step 610 with the computer system generating cryptographic information usable to authenticate communications between applications. The cryptographic information may include: a master private key (e.g., master private key 125) usable to derive private keys (e.g., user-specific private keys 127) for a plurality of users; and public key parameters (e.g., master public configuration information 135) usable to derive public keys for the plurality of users.

In step 620, the computer system sends the public key parameters to a directory service (e.g., directory service 130) accessible to the applications for retrieving the public key parameters to derive public keys that can be used to authenticate communications associated with the plurality of users. When sending the public key parameters, the computer system may send, to the directory service, certification information indicating that the computer system is authorized to register the public key parameters at the directory service in association with the particular application.

In step 630, the computer system receives, from a particular one of the applications, a request (e.g., user-specific key request 112) for a private key specific to a particular one of the plurality of users. The request may include an identifier associated with the particular user. In some cases, the computer system may receive a particular request for a private key specific to another particular user. In response to determining that the other particular user is not included in the plurality of users, the computer system may reject that particular request.

In step 640, the computer system performs a key derivation function (e.g., key derivation function 235) to generate a particular private key specific to the particular user based on the master private key and the identifier. The particular private key may be usable to sign a request from the particular application to another one of the applications on behalf of the particular user.

In step 650, the computer system sends, to the particular application, the particular private key.

In some cases, the computer system may receive, from the particular application, another request (e.g., another user-specific key request 112) for a private key specific to a different one of the plurality of users. This other request may include an identifier associated with the different user. As such, the computer system may perform the key derivation to generate a different private key specific to the different user based on the master private key and the identifier associated with the different user. The computer system may send, to the particular application, the different private key.

Figure 7:
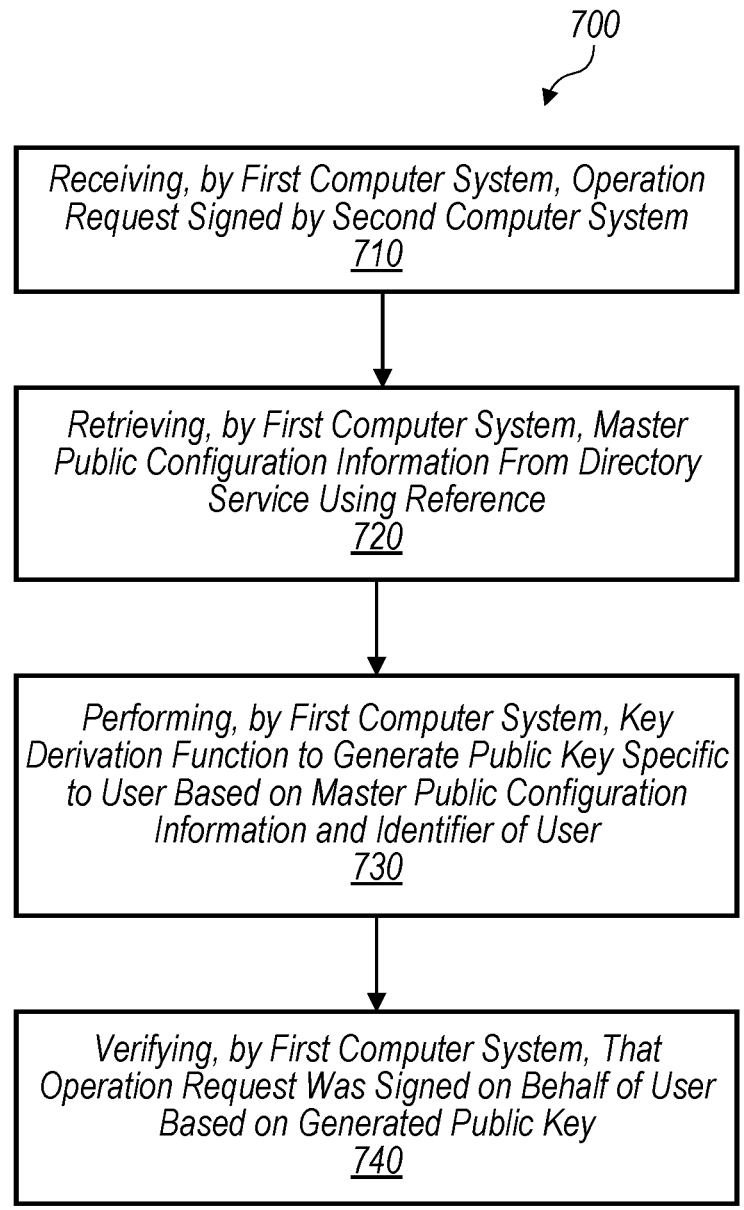

Turning now to FIG. 7, a flow diagram of a method 700 is shown. Method 700 is one embodiment of a method performed by a first computer system (e.g., one that implements an application 110) to authenticate an operation request (e.g., an operation request 115) received from a second computer system (e.g., one that implements another application 110). In some embodiments, method 700 may include additional steps. For example, the first computer system may perform the set of operations requested by the second computer system.

Method 700 begins in step 710 with the first computer system receiving an operation request signed by the second computer system. The operation request may specify a set of operations to be performed on behalf of a user of the second computer system. The operation request may include an identifier of the user and a reference to master public configuration information (e.g., master public configuration information 135) stored by a directory service (e.g., directory service 130). The first and second computer systems may be a part of a multi-user system that hosts a set of users. The first and second computer systems may further each implement a respective service for ones of the set of users.

In step 720, the first computer system retrieves the master public configuration information from the directory service using the reference. The master public configuration information may be usable by the first computer system to derive, for each user of a set of users associated with the second computer system, a public key specific to that user.

In step 730, the first computer system performs a key derivation function (e.g., key derivation function 435) to generate a public key specific to the user based on the master public configuration information and the identifier of the user. The identifier of the user may indicate the second computer system and the user.

In step 740, the first computer system verifies that the operation request was signed on behalf of the user based on the generated public key. In response to determining that a signature of the operation request is invalid, the first computer system may reject the operation request from the second computer system.

In some cases, the first computer system sends, to a third computer system, a particular operation request to perform a set of operations on behalf of a particular user of the first computer system. When sending the particular operation request, the first computer system may send a key request (e.g., a user-specific key request 112) to a private key generator (e.g., generator 120) for a private key (e.g., a user-specific private key 127) that is specific to the particular user. The key request may include an identifier of the particular user. The computer system may receive a particular private key from the private key generator and use that private key to sign the particular operation request.

Exemplary Computer System

Figure 8:
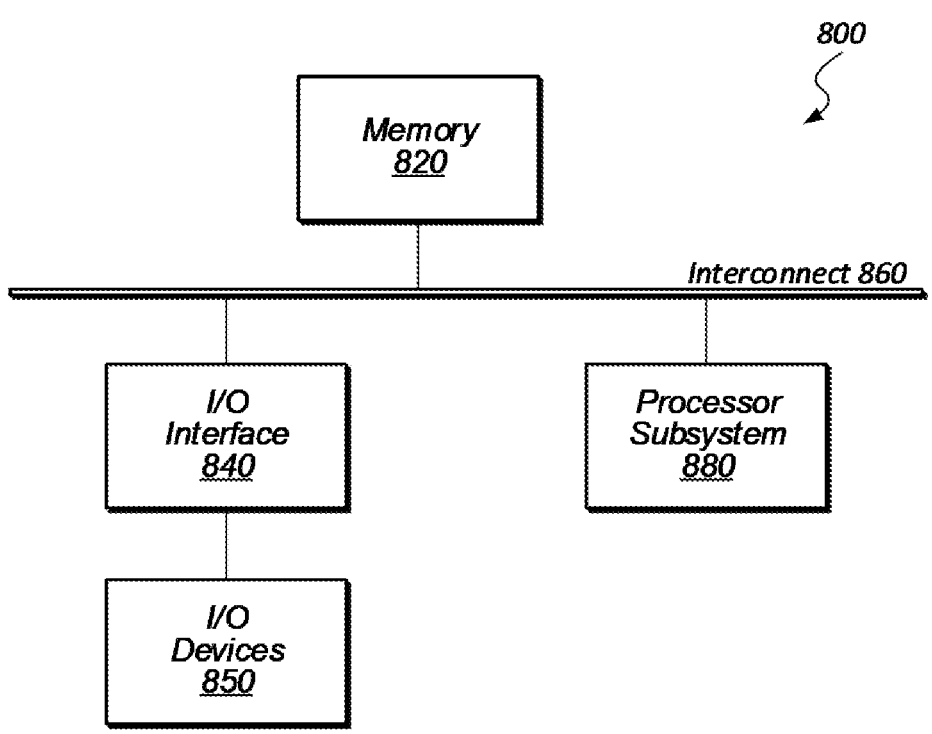
FIG. 8 is a block diagram illustrating an example computer system, according to some embodiments.

Turning now to FIG. 8, a block diagram of an exemplary computer system 800, which may implement an application 110, cryptographic information generator 120, and/or directory service 130 is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Computer system 800 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, program instructions that when executed implement an application 110, cryptographic information generator 120, and/or directory service 130 may be included/stored within system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    generating, by a computer system, cryptographic information usable for authenticating communications between first and second multi-tenant applications, wherein the cryptographic information includes:
        a master private key usable to derive, based on tenant identifiers, tenant-specific private keys for a plurality of tenants hosted by the first multi-tenant application; and
        master public information usable to derive, based on the tenant identifiers, tenant-specific public keys for the plurality of tenants;
    sending, by the computer system, the master public information to a directory service accessible to the second multi-tenant application, wherein the second multi-tenant application is operable to use the master public information to derive, without the second multi-tenant application maintaining public keys for each of the plurality of tenants, tenant-specific public keys that can be used to authenticate communications from the first multi-tenant application;
    receiving, from the first multi-tenant application by the computer system, a key request for a tenant-specific private key for a tenant of the plurality of tenants that is useable to sign a request to the second multi-tenant application on behalf of the tenant, wherein the key request and the request to the second multi-tenant application include a tenant identifier that identifies the tenant;
    performing, by the computer system, a key derivation function to generate a particular tenant-specific private key for the tenant based on the master private key and the tenant identifier; and
    sending, by the computer system, the particular tenant-specific private key to the first multi-tenant application.

2. The method of claim 1, further comprising:
    receiving, from the first multi-tenant application by the computer system, a subsequent key request for a tenant-specific private key for a different tenant of the plurality of tenants, wherein the subsequent key request includes an identifier of the different tenant; and
    performing, by the computer system, the key derivation function to generate a different particular tenant-specific private key for the different tenant based on the master private key and the identifier of the different tenant.

3. The method of claim 1, further comprising:
accessing, by the computer system, certificate information indicating that the computer system is authorized to generate cryptographic information for the plurality of tenants hosted by the first multi-tenant application.

4. The method of claim 3, wherein sending the master public information to the directory service includes:
sending, to the directory service by the computer system, the certificate information to enable registration of the master public information at the directory service on behalf of the first multi-tenant application.

5. The method of claim 3, further comprising:
receiving, by the computer system, a subsequent key request for a tenant-specific private key for a particular tenant not indicated by the certificate information; and
rejecting, by the computer system, the subsequent key request.

6. The method of claim 3, further comprising:
performing, by the computer system, a refresh operation that replaces the master private key and the master public information with a new master private key and new master public information, respectively.

7. The method of claim 6, wherein the refresh operation is performed in response to the certificated information being modified.

8. The method of claim 1, wherein the first multi-tenant application is operable to sign the request to a second multi-tenant application using the particular tenant-specific private key, and wherein the request to the second multi-tenant application includes information identifying the master public information at the directory service.

9. The method of claim 1, wherein the first multi-tenant application is a cloud-based service that is operable to store data for the plurality of tenants, and wherein the tenant identifier of the tenant further identifies the cloud-based service.

10. The method of claim 1, wherein the generating of the cryptographic information is performed by a cryptographic information generator executing on the computer system, wherein the cryptographic information generator and the first multi-tenant application are deployed on a virtual cluster.

11. The method of claim 10, wherein the cryptographic information generator is accessible only by entities of the virtual cluster.

12. The method of claim 1, wherein the first and second multi-tenant applications are part of the same multi-tenant system.

13. A non-transitory computer readable medium having program instructions stored thereon that are capable of causing a computer system to perform operations comprising:
generating cryptographic information usable to authenticate communications between first and second multi-tenant applications, wherein the cryptographic information includes:
a master private key usable to derive, based on tenant identifiers, tenant-specific private keys for a plurality of tenants hosted by the first multi-tenant application; and
public key parameters usable to derive, based on the tenant identifiers, tenant-specific public keys for the plurality of tenants;
sending the public key parameters to a directory service accessible to the second multi-tenant application for retrieving the public key parameters, wherein the second multi-tenant application is operable to use the public key parameters to derive, without the second multi-tenant application maintaining public keys for each of the plurality of tenants, tenant-specific public keys that can be used to authenticate communications from the first multi-tenant application;
receiving, from the first multi-tenant application, a key request for a tenant-specific private key specific to a tenant of the plurality of tenants that is useable to sign a request to the second multi-tenant application on behalf of the tenant, wherein the key request and the request to the second multi-tenant application include a tenant identifier that identifies the tenant;
performing a key derivation function to generate a particular tenant-specific private key specific to the tenant based on the master private key and the tenant identifier; and
sending, to the first multi-tenant application, the particular tenant-specific private key.

14. The medium of claim 10, wherein the operations further comprise:
receiving, from the first multi-tenant application, another key request for a tenant-specific private key specific to a different tenant of the plurality of tenants, wherein the other key request includes an identifier that is associated with the different tenant;
performing the key derivation function to generate a different tenant-specific private key specific to the different tenant based on the master private key and the identifier associated with the different tenant; and
sending, to the first multi-tenant application, the different tenant-specific private key.

15. The medium of claim 10, wherein sending the public key parameters to the directory service includes:
sending, to the directory service, certification information indicating that the computer system is authorized to register the public key parameters at the directory service in association with the first multi-tenant application.

16. A method, comprising:
receiving, by a first multi-tenant application executing on a first computer system, an operation request signed by a second multi-tenant application executing on a second computer system, wherein the operation request specifies a set of operations to be performed on behalf of a tenant of a plurality of tenants of the second computer system, and wherein the operation request includes a tenant identifier that identifies the tenant and a reference to master public information stored by a directory service, and wherein master public information is usable by the first multi-tenant application to derive, without the first multi-tenant application maintaining public keys for each of the plurality of tenants, tenant-specific public keys that can be used to authenticate communications from the second multi-tenant application;
retrieving, by the first multi-tenant application, the master public information from the directory service using the reference;
performing, by the first multi-tenant application, a key derivation function to generate a tenant-specific public key specific to the tenant based on the master public information and the tenant identifier specified in the operation request; and
verifying, by the first multi-tenant application, that the operation request was signed on behalf of the tenant based on the generated tenant-specific public key.

17. The method of claim 16, further comprising:
sending, to a third computer system by the first computer system, a particular operation request to perform a set of operations on behalf of a second tenant of the first computer system, wherein sending the particular operation request includes:
sending a key request to a private key generator for a tenant-specific private key that is specific to the second tenant, wherein the key request includes a second tenant identifier that identifies the second tenant;
receiving a particular tenant-specific private key from the private key generator; and
signing the particular operation request based on the particular tenant-specific private key.

18. The method of claim 17, wherein the second tenant identifier further indicates the second computer system.

19. The method of claim 16, further comprising:
in response to determining that a signature of the operation request is invalid, the first multi-tenant application rejecting the operation request from the second multi-tenant application.

20. The method of claim 16, wherein the first and second computer systems are a part of a multi-user system that hosts the plurality of tenants, and wherein the first and second computer systems each implement a respective service for ones of the plurality of tenants.

\* \* \* \* \*